March 31, 1942. F. G. SILVA 2,277,997
MACHINE FOR MAKING POLYGONAL OPENINGS
Filed Aug. 8, 1938 6 Sheets-Sheet 1

INVENTOR.
Frederick G. Silva
BY Cumpston & Shepard
his ATTORNEYS

March 31, 1942. F. G. SILVA 2,277,997
MACHINE FOR MAKING POLYGONAL OPENINGS
Filed Aug. 8, 1938 6 Sheets-Sheet 2

INVENTOR.
Frederick G. Silva
BY Cumpston & Shepard
his ATTORNEYS

March 31, 1942. F. G. SILVA 2,277,997
MACHINE FOR MAKING POLYGONAL OPENINGS
Filed Aug. 8, 1938 6 Sheets-Sheet 5

INVENTOR.
Frederick G. Silva
BY Cumpston & Shepard
his ATTORNEYS March 31, 1942. F. G. SILVA 2,277,997
MACHINE FOR MAKING POLYGONAL OPENINGS
Filed Aug. 8, 1938 6 Sheets-Sheet 6

INVENTOR.
Frederick G. Silva
BY Cumpston & Shepard
his ATTORNEYS

Patented Mar. 31, 1942

2,277,997

UNITED STATES PATENT OFFICE 2,277,997

MACHINE FOR MAKING POLYGONAL OPENINGS

Frederick G. Silva, Rochester, N. Y., assignor to Davenport Machine Tool Co., Inc., Rochester, N. Y., a corporation of New York Application August 8, 1938, Serial No. 223,575

24 Claims. (Cl. 90—49)

My invention relates to a machine for making a polygonal opening in stock.

While my invention is concerned generally with a machine for making polygonal openings of various shapes in bored stock, regardless of the later use of the finished piece, it is particularly concerned with a machine for making polygonal openings in collets and will be described in that connection. However it will be understood that the invention is of general application.

An object of my invention is to provide a machine for automatically cutting and completing a polygonal opening in a piece of stock.

Another object of my invention is to provide a machine for automatically after once set, cutting and completing an equilateral polygonal opening having straight sides in a piece of bored stock.

Another object of my invention is to provide a machine for making a polygonal opening in a piece of stock having a bore by means of a cutting tool wherein the tool and the work are moved relative to each other to cut partially at least one corner of the polygonal opening; and wherein the tool and the work are indexed with respect to each other to cut partially preferably successively, without feeding, additional corners of the polygonal opening until all the corners of the polygon have been partially cut and a cycle of cutting operations has been completed; and wherein the stock and tool are fed relative to each other after each such cycle of cutting operations has been performed to thereby form the polygonal opening by successive cycles of cutting and feeding operations.

My invention further comprises a means for making a polygonal opening in a piece of stock having a bore by means of a cutting tool wherein the tool and the stock are continuously and rapidly reciprocated with respect to each other while indexing the work to thereby preferably successively cut the corners and side walls of the polygonal opening and after all the corners and side walls have been partially cut, feeding the tool and the work relative to each other so that a second series of cuts may be made in the work and repeating said operations to thereby gradually form a polygonal opening in the stock of the desired size and shape.

More specifically, my invention comprises a machine for making an equilateral polygonal opening having straight sides in a piece of bored stock by means of a cutting tool having two cutting edges extending at an angle to each other, corresponding to the angularity of the corners of the polygonal opening to be cut, and each of the cutting edges being of a width at least half that of one of the sides of the polygon; reciprocating such a tool in the bore of the work so that one corner and part of both sides of the polygon adjacent the corner are cut at a single stroke of the cutting tool; thereafter making additional similar cuts in the work of a shape and size corresponding to that of the first cut until the polygonal opening has been partially formed and a cycle of cutting operations has been completed; then feeding the tool and the work relative to each other to perform a second cycle of cutting operations, and performing additional cycles of cutting and feeding operations until an equilateral polygonal opening having straight sides is formed.

In addition my invention comprises a machine for making a polygonal opening in a piece of stock wherein the cutting, indexing and feeding operations are carried on automatically and in timed relation, whereby a series of congruent pieces of material are cut from the stock at different points thereof and the indexing of the machine is accomplished at the end of a series of such cuts and after the tool has been moved out of cutting relation with the work to thereby condition the machine for a second series of cuts.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

The machine of my invention for cutting automatically a polygonal opening in a piece of bored stock, such as a hexagonal or square opening in a collet, comprises a main frame 21 which houses and supports the driving mechanism, the reciprocating mechanism for the tool, and the feeding mechanism for the tool; and a sub-frame for carrying the work holding means and for housing part of the work indexing mechanism.

Figure 1:
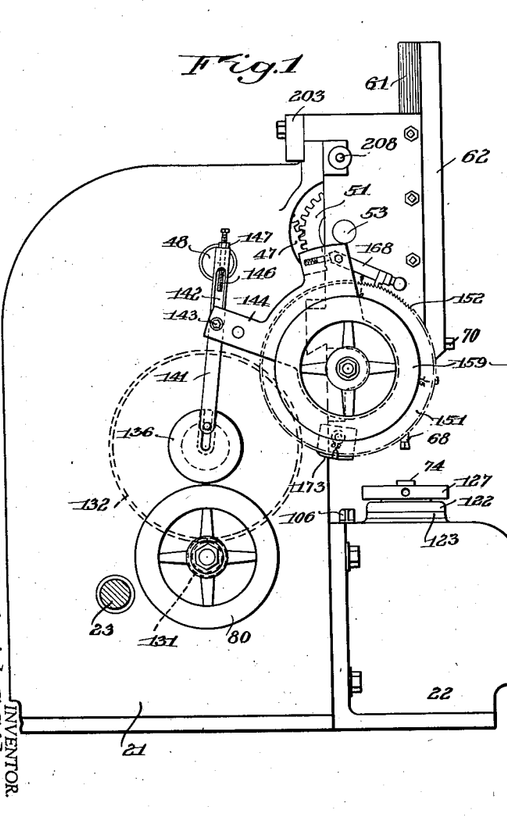
Fig. 1 is a side elevation of the machine of my invention.
Figure 2:
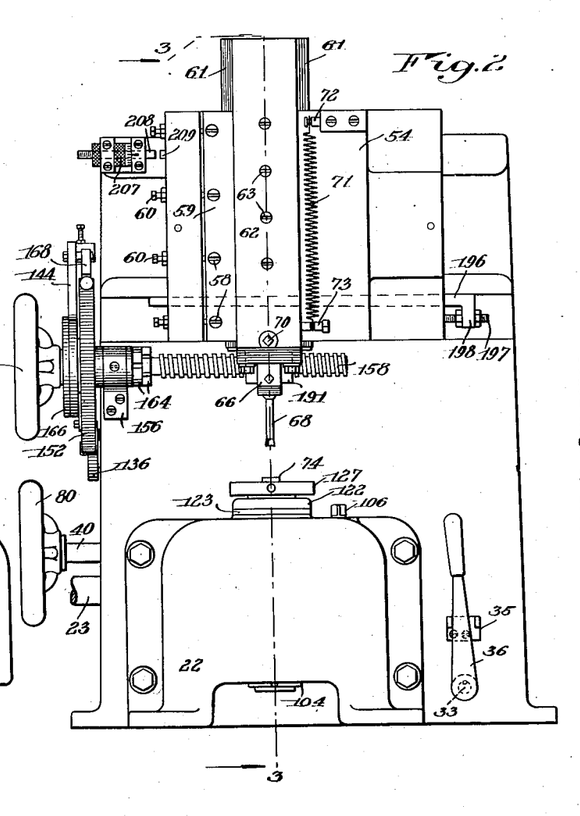
Fig. 2 is a front elevation of the machine.
Figure 3:
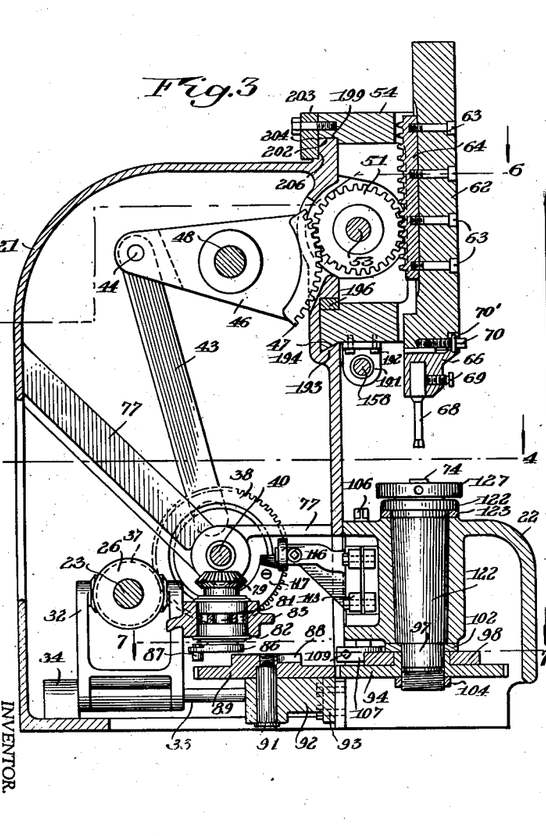
Fig. 3 is a sectional view taken on the line 3—3 of Fig. 2, in the direction indicated by the arrows.
Figures 4, 5:
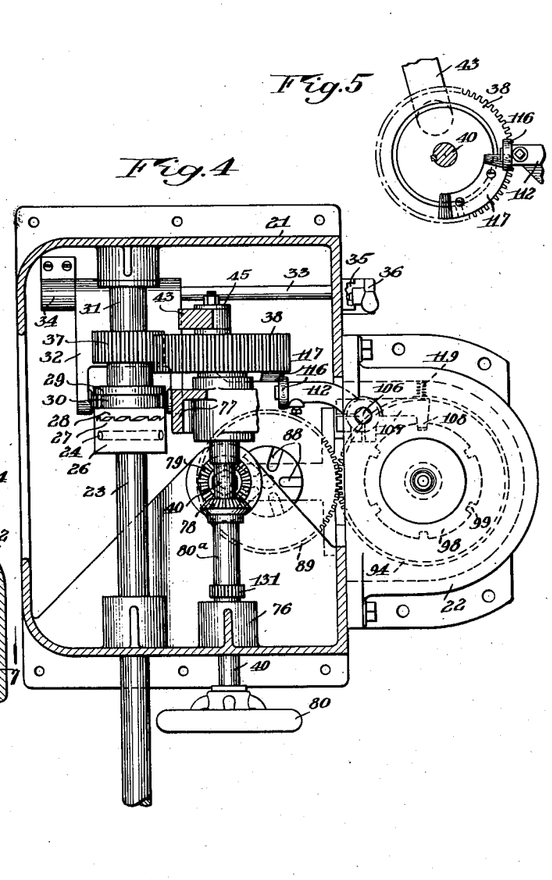
Fig. 4 is a sectional view taken on the line 4—4 of Fig. 3 in the direction indicated by the arrows and showing in dotted lines part of the indexing mechanism.
Fig. 5 is a face of the crank and locking cam shown in Figs. 3 and 4.
Figure 8:
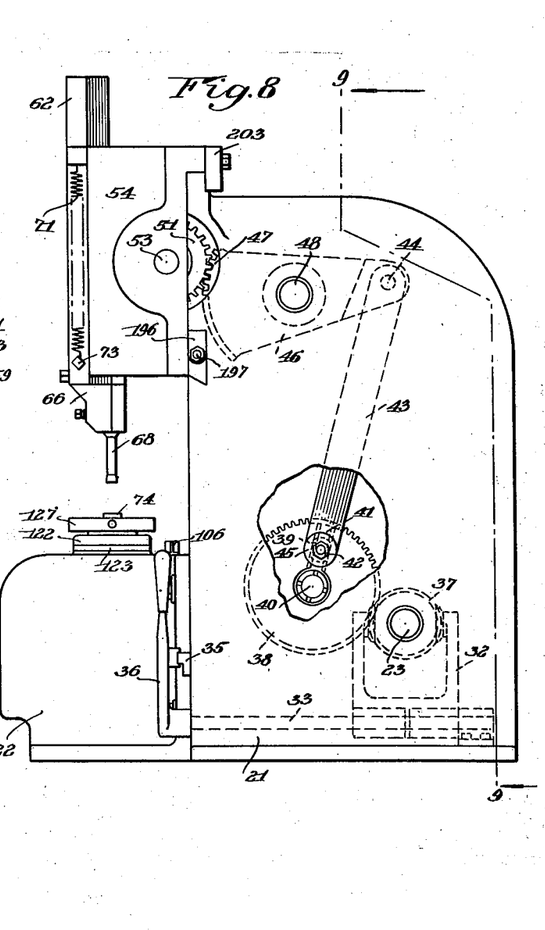
Fig. 8 is an elevation of the opposite side of the machine from that of Fig. 1.
Figure 9:
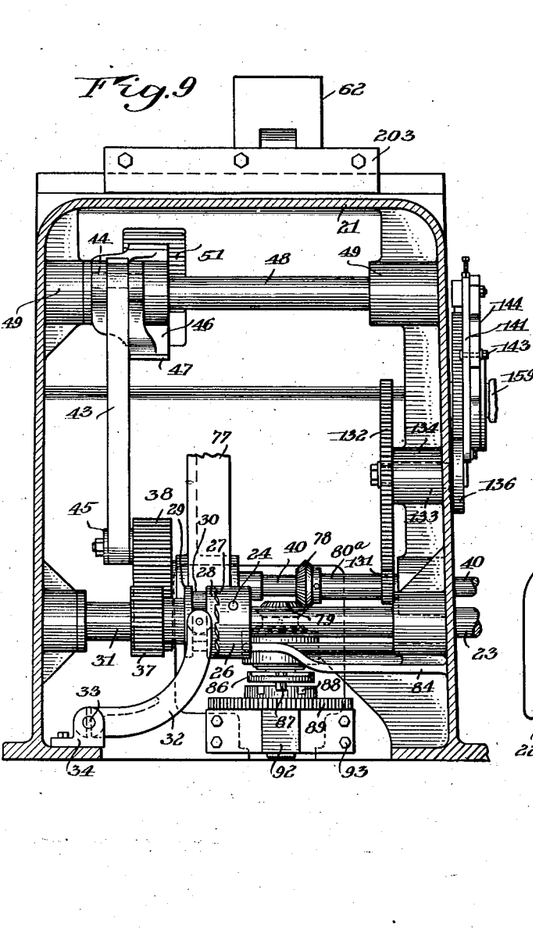
Fig. 9 is a sectional view taken on the line 9—9 of Fig. 8 in the direction indicated by the arrows.

A main shaft 23 journaled in the main frame of the machine and driven in any suitable manner by means of a motor or other suitable source of power, not shown; is continuously rotated and has rigidly mounted thereon by means of a pin 24 a clutch element 26 (Fig. 9). The clutch element 26 has clutch teeth 27 thereon adapted to mesh with clutch teeth 28 integral with a clutch element 29. The clutch element 29 is loosely and slidably mounted on a sleeve 31 carried by the main shaft 23. The clutch element 29 is moved into and out of engagement with the clutch element 26 by means of a starting clutch fork 32 (Figs. 3 and 8). The clutch fork 32 has the forks of its forked end engaging in a clutch groove 30 and has its other end rigidly secured to a clutch operating rod 33 by means of a pin (Fig. 9). The clutch operating rod is carried by a support 34 mounted on the main frame 21. The clutch operating rod extends from the rear of the machine toward and protrudes through the front of the frame (Figs. 4 and 8). On the outer end of the clutch operating rod 33 is mounted a hand lever 36, shown more clearly in Fig. 2. On the main frame of the machine is a suitable arrangement 35 (Fig. 4) for maintaining the hand lever 36 releasably in a position such that the clutch 29 is in engagement with the clutch 26, or out of engagement therewith. When the hand lever 36 is thrown out of engagement, all of the operations of the machine are stopped.

Figure 6:
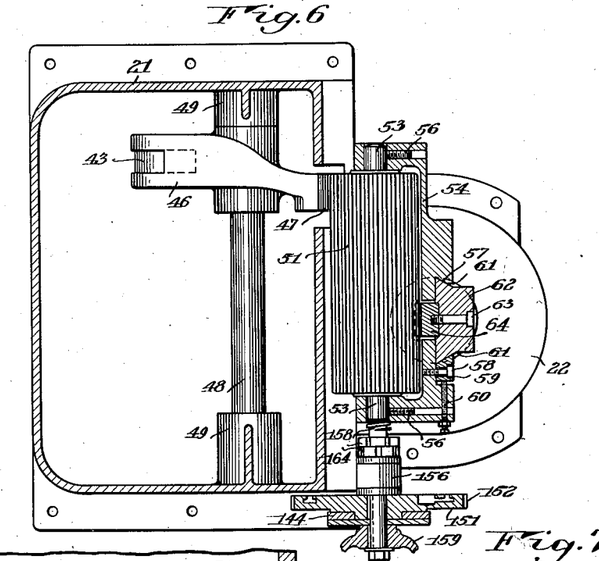
Fig. 6 is a sectional view taken on the line 6—6 of Fig. 3, in the direction indicated by the arrows and showing part of the tool reciprocating mechanism.

Formed integrally with the clutch element 29 is a driving pinion 37 (Fig. 9) which meshes with a crank gear 38 mounted rigidly on a shaft 40. The crank gear 38 has eccentrically mounted in a slot extending radially in a face thereof a headed crank pin 39. The crank pin has a threaded end and is adjustably held in position by a nut 42. A washer 45 is interposed between the nut and the pitman and between the pitman and the crank gear. By adjusting the position of the crank pin, with respect to the axis of rotation of the crank gear 38, the throw of a pitman 43 connected to the crank pin may be varied. The other end of the pitman is pivotally secured at 44 to a segment gear 46 having gear teeth 47 (Figs. 3 and 8). Segment 46 is rigidly secured to a horizontal rock shaft 48. The rock shaft 48 extends transversely of the frame and is suitably journaled therein, as indicated at 49 (Figs. 6 and 9). The segment extends through an opening 50 in the frame and the teeth 47 thereof mesh with a slide gear 51. The slide gear has a relatively wide face so that engagement of the teeth of the slide gear with the teeth of the segment will be maintained during feeding operations, as will later be described. The slide gear is supported and oscillatable on a shaft 53 (Fig. 6) positioned in a horizontally movable feed carriage 54 by means of set screws 56.

Formed integral with the feed carriage is a rigid way (Fig. 6) 57 and secured to the feed carriage by means of screws 58 is a removable or adjustable way or gib 59. The removable way or gib 59 is held in adjusted position by means of set screws 60 provided with jam nuts. The ways 57 and 59 are adapted to receive between them the slide portions 61 of a vertically reciprocable tool block carrier 62. The tool block carrier 62 has rigidly secured to its rear face (Fig. 3) by means of screws 63 a rack 64 the rack teeth of which mesh with the slide gear 51. A tool block 66 (Fig. 13) is mounted in assembled relationship with the tool block carrier by means of screws 65 and an adjusting screw 70 having a collar 70' (Fig. 3). Upon loosening the screws 65 the tool block may be moved forwardly or rearwardly by adjusting the screws 70.

The tool 68 is held in the tool block by means of a set screw 69. A spring 71 has one end fixed, as indicated at 72 (Fig. 2) to the feed carriage 54 and the other end to the tool block carrier, as indicated at 73, in accordance with well known practices, to minimize backlash of the gear teeth in the driving assembly. When the clutch elements 26 and 29 are in engagement, the segment gear 46 is oscillated to thereby oscillate the slide gear 51 and continuously reciprocate the tool 68 into and out of engagement with the work 74, in this case a collet.

The work is indexed by mechanism driven from the shaft 40. The shaft 40 (Fig. 4) has one end journaled in a boss 76 formed integral with the frame of the machine, and has its inner end supported by and journaled in a pair of brackets 77 formed as part of the frame. The shaft projects through the frame and has mounted on the projecting end a hand wheel 80 for setting or operating the machine by hand. The shaft 40 is continuously rotated, when the clutch elements are in engagement, and drives a bevel gear 78 rigidly secured to a sleeve 80a rigid with the shaft 40. The bevel gear 78 meshes with a bevel gear 79 rigidly mounted on a vertical shaft 81. The shaft 81 is journaled in a roller bearing assembly 82 (Fig. 3), the outer faces of which are carried by a shaft support 83 extending from the frame of the machine, as indicated at 84 (Fig. 9).

Figure 7:
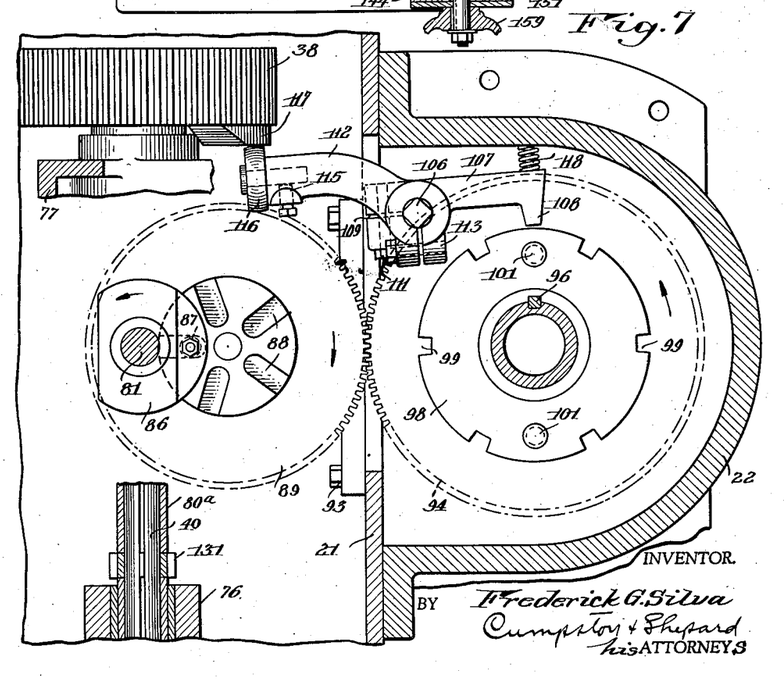
Fig. 7 is a sectional view taken on the line 7—7 of Fig. 3, in the direction indicated by the arrows and showing part of the indexing mechanism.

On the lower end of the shaft 81 is rigidly mounted (Figs. 3 and 7) a crank 86 which constitutes the driving element of a Geneva motion. The crank 86 has rigidly secured thereto a crank pin 87 which is adapted to engage successively in each one of a plurality of slots 88 formed in a Geneva motion gear or disk 89. There are five slots 88 formed on the upper face of the gear 89 to form the Geneva motion disk, and as is well known in the art to which this invention applies, the pin drives the gear one-fifth of a rotation, after which the pin passes out of the slot, continues its rotation, and engages in the next succeeding slot. As shown in Fig. 7, the crank is driven in a counterclockwise direction, so that the gear 89 is intermittently driven in a clockwise direction. The gear 89 is supported (Fig. 3) on a shaft 91 carried by a bracket 92 bolted to the frame of the machine, as indicated at 93. The gear 89 drives a gear 94.

Figure 13:
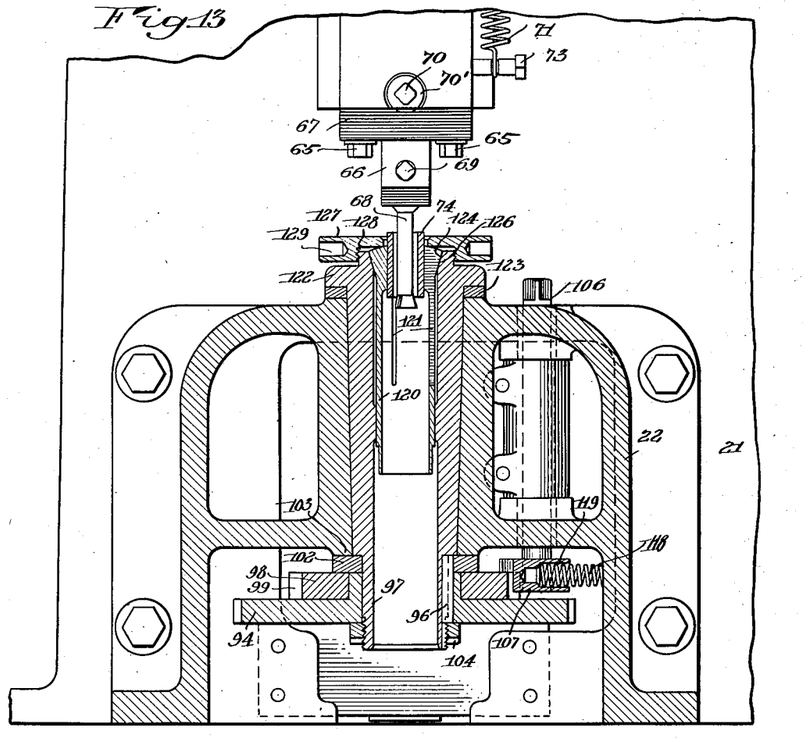
Fig. 13 is a sectional view showing the means for holding the work and a portion of the mechanism for indexing the work.

As shown in Figs. 7 and 13, the gear 94 is mounted in the sub-frame 22, the drive between the Geneva motion gear 89 and the gear 94 being through an opening in the main frame. The gear 94 is, by means of a key 96, rigidly secured to a chuck spindle 97. On the upper face of the gear 94 is mounted a locking disk 98 which has six locking slots or teeth 99. The locking disk is fixed relative to the gear 94 by pins 101 so that the gear 94 and the locking disk 98 rotate together. A washer 102 is interposed between the upper face of the locking disk and a boss 103 formed integral with the sub-frame 22. The assembly of gear 94, locking disk 98, and washer 102 is held in position on the chuck spindle by a nut 104 threaded to the bottom of the chuck spindle 97.

Mounted on a vertical shaft 106 carried and journaled in the sub-frame 22 is a locking lever 107 having a locking tooth 108. The locking lever, where it engages the shaft, is split as indicated at 109. A bolt 111 extends through the split portions of the locking lever so that when the bolt is drawn up tight the locking lever will be rigidly clamped to the shaft. Also mounted on the shaft 107 is a cam actuated lever 112. The cam lever 112 is rigidly secured to the shaft by a bolt 113 which extends through a split portion formed on the cam lever 112. The cam lever has mounted on the end thereof and secured in position in any suitable manner, as indicated at 115, a cam roller 116. The cam roller is adapted to ride on the peripheral side edge of the crank gear 38 (Figs. 4, 5, and 7) and be actuated by a cam 117 carried on the peripheral side edge of the crank gear 38. The cam is adjustably mounted in the crank gear through bolts extending into an annular T-slot formed in the crank gear. A spring 118, mounted in a bore 119 (Figs. 7 and 13) in the locking lever 107 and having one end engaging the wall of the sub-frame, normally urges the locking lever 107, the shaft 106, and the cam lever 112 in a clockwise direction as viewed in Fig. 7. The locking tooth 108 is thus normally urged into engagement with one of the teeth of the locking disk 98.

As the bevel gear 78 is rotated, the crank 86 is rotated in a counterclockwise direction as viewed in Fig. 7, which results in a step by step rotation of the Geneva motion gear 89 causing a step by step rotation of the gear 94. The ratio of teeth of the gear 89 to that of the gear 94 is 5 to 6 so that as the gear rotates through one-fifth of a revolution, the gear 94, and also the locking disk, rotates through one-sixth of a revolution. It will be noted that the bevel gears 78 and 79 have an equal number of teeth so that the crank 86 makes a complete rotation for each rotation of the crank gear 38. The locking disk, together with the gear 94, therefore, make one-sixth of a revolution for each complete rotation of the crank gear 38. The tooth 108 of the locking lever is normally in spring pressed engagement with one of the teeth 99 of the locking disk so that the chuck spindle is held against rotation.

When the crank gear 38 nears the completion of a rotation, the cam 117 through the cam lever 112 moves the tooth 108 of the locking lever out of engagement with a locking tooth 99 of the locking disk, against the action of the spring 118, so as to permit rotation of the gear 94 and the locking disk. At the same time as the locking disk is released the crank 86 nears the completion of a rotation and the pin 87 engages the next succeeding slot 88 and rotates the disk to thereby rotate the gear 94 and the chuck spindle 97.

The work is held by means of a chuck 120 which is slotted as shown at 121 (Fig. 13) to provide spring fingers. The upper end of the chuck spindle has a flange 122 adapted to be received on an annular bearing surface 123 on which the spindle rotates as the work is indexed. The outer circumference of the top of the chuck 120 has an external frusto-conical surface 124 adapted to mate with an internal frusto-conical surface 126 formed on the chuck spindle. A nut 127 having a threaded bore 128 is adapted to engage the top of the chuck so that when the nut is turned down, by means of a tool inserted in tool receiving openings 129, the chuck is moved downward along the frusto-conical surfaces to draw in the spring fingers 121 and tightly grip the work 74. Since the tool makes a complete reciprocation for each rotation of the crank gear 38 and the chuck spindle is rotated one-sixth of a revolution for each complete rotation of the crank gear 38 the tool is indexed in synchronism with the reciprocations of the tool. Thus in making a hexagonal opening in a piece of work, as shown in Figs. 14 to 17, the tool makes six cuts to at least partially form each corner of the hexagonal opening before a feeding operation takes place.

The tool is fed at the completion of six reciprocations by mechanism which comprises a pinion 131 (Figs. 4 and 9) rigidly secured with respect to the shaft 40. The pinion 131 drives a large gear 132 (Fig. 9) mounted on a stub shaft 133 journaled in the frame, as indicated at 134. The stub shaft 133 projects through the frame of the machine and at its outer end carries rigidly secured thereto a feed disk 136. As shown more clearly in Fig. 10, the disk 136 has a T-slot 137 in its face adapted to receive a headed crank pin 138 which is adjustably held in the T-slot by a nut 139. A connecting rod 141 is rotatably secured to the crank pin 138 so that as the disk 136 rotates, the connecting rod 141 is oscillated. The upper end of the connecting rod is provided with a slot 142 adapted to receive a pin 143. The pin 143 extends through an aperture formed in a pawl carrier 144. The pin 143 and the slot 142 together constitute a lost motion connection between the connecting rod 141 and the pawl carrier 144. The amount of lost motion may be adjusted by means of a screw 146 held in position by means of a jam nut 147.

The pawl carrier 144 has a central opening 148 adapted to be received loosely on a flange 149 (Fig. 11) formed integral with a feed ratchet wheel 151. The feed ratchet wheel is provided at its outer circumference with ratchet teeth 152 and is rigidly secured by means of a key 153 to a shaft 154. The shaft 154 is carried in a bracket 156 mounted on the frame of the machine. The shaft 154 has a threaded portion 157 and a worm portion 158 constituting a feed screw. A hand wheel 159 to enable setting of the tool is mounted on the end of the shaft by means of a key 161. The end of the shaft is threaded, as indicated at 162, to receive a nut 163. A pair of jam nuts 164 are screwed on the threaded portion 157 of the shaft. The entire assembly is rigidly held in position between the nut 163 and the jam nuts 164, washers 166 being interposed between the nut 163 and the hand wheel 159, between the hand wheel 159 and the feed ratchet wheel 151, between the feed ratchet wheel 151 and the bracket 166, and between the bracket 156 and the jam nuts 164. Sufficient friction is provided in the assembly between the washer 166, the pawl carrier 144 and the feed ratchet wheel 151 to frictionally hold the pawl carrier 144 in any adjusted position.

Figure 11:
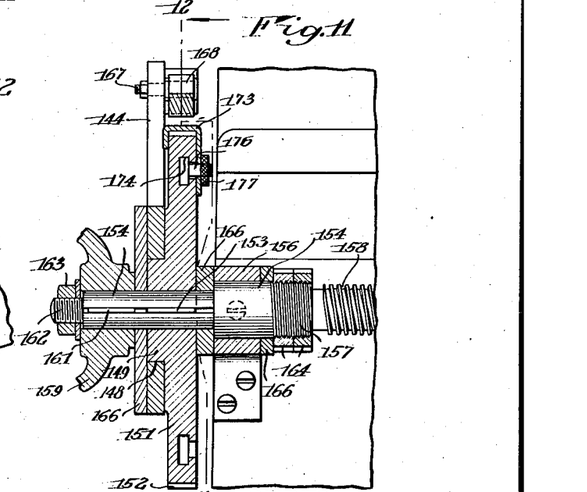
Fig. 11 is a sectional view taken on the line 11—11 of Fig. 10, in the direction indicated by the arrows.
Figure 12:
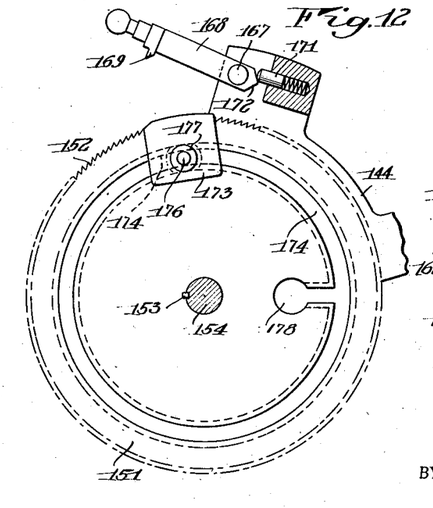
Fig. 12 is a view taken on the line 12—12 of Fig. 11, in the direction indicated by the arrows.

The pawl carrier 144 has pivotally mounted (Fig. 10) as indicated at 167, a pawl 168 having a tooth 169 adapted to engage successively the teeth 152 of the feed ratchet wheel 151. A spring pressed pin 171 engages an angular end 172 formed on the end of the pawl so that the pawl may be retained in ratchet wheel engaging position, as shown in Fig. 11, or moved to the position shown in Fig. 12 out of engagement with the teeth of the feed ratchet wheel. Mounted on the feed ratchet wheel is an adjustable clip 173. The clip, as shown in Fig. 11, is mounted in an annular T-slot 174 formed in the face of the feed ratchet wheel by means of a headed pin 176. The pin is threaded and provided with a nut 177 by which the clip may be held in the T-slot in any adjusted position. The head of the pin 176 may be inserted through an enlarged opening 178 in the face of the feed ratchet wheel and then moved into the T-slot 174. The face of the feed ratchet wheel may be graduated, as indicated at 179, and provided with a zero point indicated at 181. The feed ratchet wheel may be graduated in hundredths or any desired division units.

Figures 14, 15:
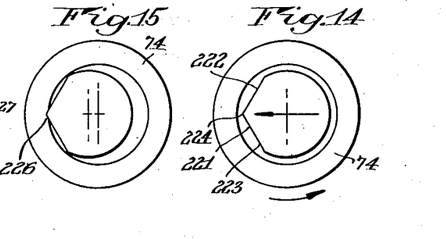
Figs. 14 to 17, inclusive, illustrate steps in the operation of cutting a hexagonal opening in a piece of stock.

The tool block is first set by the adjustment screw 70 forwardly or rearwardly and the tool itself is set by the set-screw 69 so that the cutting edges of the tool are in the proper position with respect to the work, as indicated in Fig. 14. By the hand wheel 159 the tool carriage, together with the tool, may be moved right or left as viewed in Fig 2. The adjustable clip 173 is then moved in its T-slot to the desired point along the periphery of the feed ratchet wheel 151. The tool will then feed until the feed ratchet wheel rotates to a position such that the clip is beneath the tooth 169 of the pawl 168 when feeding will stop.

Figure 10:
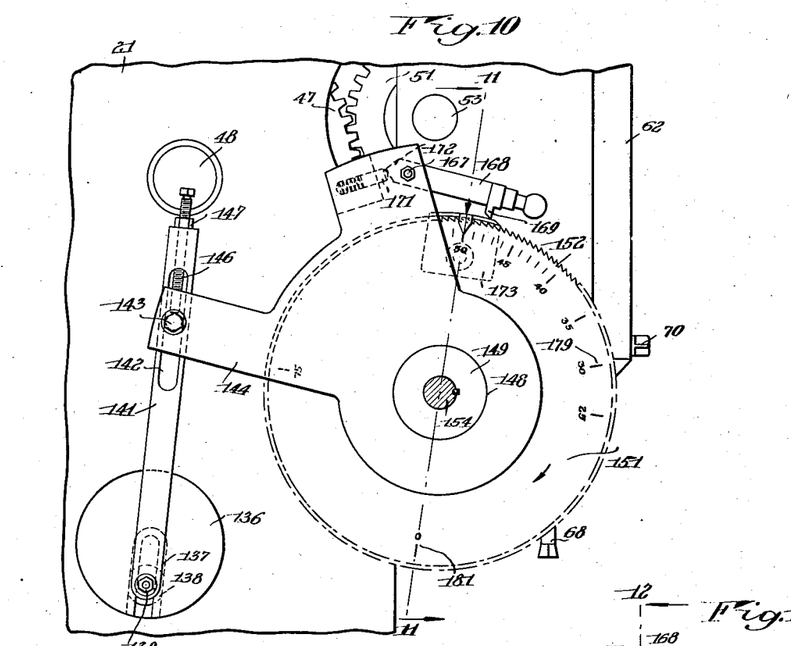
Fig. 10 is a view of a portion of the feeding mechanism.

In the position of the parts shown in Fig. 10 the crank 141 has just completed a down stroke so that the end of the screw 146 is in engagement with the pin 143 and has just moved the pin to its down position. When the connecting rod 141 moves upward it will have no effect on the pawl carrier 144 until near the extreme upper portion of its stroke when the lower end of the slot will engage the pin 143, rotate the pawl 144 slightly in a clockwise direction, and move the feed ratchet wheel one notch. The lost motion connection is provided and adjusted so that feeding of the tool will be accomplished at the end of six reciprocations of the tool and when the tool is out of engagement with the work. When the connecting rod reaches its uppermost position and starts downward, the pawl carrier 144 will not follow it due to the friction between the pawl carrier, the washer 166 and the feed ratchet wheel as mentioned above. Instead the pawl carrier will remain in its uppermost position until, with the continued downward movement of the connecting rod 141, the end of the screw 146 engages the pin 143. Continued downward movement of the connecting rod to the position shown in Fig. 10 rotates the pawl carrier 144 in a counterclockwise direction so that the tooth 169 of the pawl 168 ratchets a tooth. The pawl carrier 144 will stay in this lowered position without dropping from the position shown in Fig. 10, due to the friction between the parts, as mentioned above.

The feed carriage 54, as shown in Fig. 3, has a bracket 191 mounted on the lower side thereof by means of screws 192. The bracket is threaded to receive the feed screw 158 so that as the feed screw is rotated the feed carriage is moved. The feed carriage is mounted in a rigid guide way 193 formed in the frame of the machine, and is formed with a slide part 194 for reception in said way. A tapered bar 196, shown more clearly in Fig. 2, may be wedged between the frame and the carriage and serves to maintain a close fit between the parts. The tapered bar 196 may be adjusted by adjusting it along a spindle 197 by means indicated at 198.

The feed carriage is U-shaped in cross section, as shown in Fig. 3, to accommodate the slide gear 51. The upper end of the U is provided with a part 199 which engages part of the main frame. A bar 203 is removably secured in position on the carriage, as shown in Fig. 3, and has a slide part 204 adapted to bear against a guide way 206. As the feed screw 158 rotates the feed carriage is moved along the ways to feed the tool 68 into the work. As shown in Fig. 2, a micrometer 207 is mounted on the frame and provided with a stop 208. A stop 209 on the carriage is also provided. A micrometer may be used as an aid in setting the machine.

The operation of the machine may be more clearly understood from consideration of Figs. 14 to 17, inclusive. The work 74, usually a part having a circular bore, is set in the chuck 126 and the nut 127 turned down so that the work is securely held. The machine is then properly set as described above. Usually it is necessary to initially set the machine by cut and try on a piece of work. After once properly set, the machine, without further adjustment will perform the same operations on additional pieces of work. The hand lever 36 is then thrown to engage the clutch elements 26 and 29. Through the crank gear 38, segment 46, slide gear 51, and rack 64, the tool is continuously reciprocated.

Figure 16:
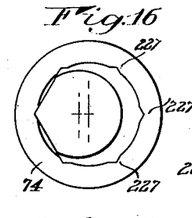

The tool, as shown in Fig. 14, has a cutting edge generally indicated by the numeral 221. The cutting edge 221 comprises side cutting edges 222 and 223 which extend at an angle to each other corresponding to the angle of the polygonal opening to be cut. In the case under consideration, a hexagon, the sides 222 and 223 will be at an angle of 60° with respect to each other. The point 224 of the tool cuts a notch in the work, as shown at 226 (Fig. 15). During the reciprocation of the tool the work is held rigidly in position by the engagement of the locking lever 187 with the locking disk 98. Upon the completion of a reciprocation when the tool is out of the work, the work is indexed through the Geneva motion, as previously described, the locking lever 187 being released from holding engagement with the locking disk by the actuation of the locking lever through the cam 117 on the crank gear 138. The work indexes in this case six times while the tool is continuously reciprocated to cut six notches 227 of equal depth in the work, as indicated in Fig. 16. The tool is then fed through the continuous rotation of the disk 136 and the intermittent movement of the feed ratchet wheel occasioned by actuation of the pawl carrier 144 as described above.

Figure 17:
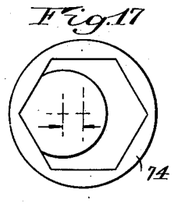

It will be appreciated that with a ratio of teeth on the pinion 131 and the gear 132 (Fig. 9) of one to six, the feed ratchet wheel will be moved once for each six complete rotations of the crank gear 38 or once for each six reciprocations of the tool, or six indexings of the work. Rotation of the feed ratchet wheel rotates the feed screw 158 and moves the feed carriage carrying the tool 68. Due to the lost motion connection 142, 143 the feeding operation may be caused to occur near the end of the sixth reciprocation when the tool is out of the work. After a feeding operation has been performed, the continued reciprocation of the tool 68 and the continued indexing of the work 74 causes a second series of six cuts to be made in the work to deepen the notches shown at 227 in Fig. 16. Additional feeding operations and additional cycles of cutting and indexing of the work are performed until a polygonal opening, in this case, a hexagonal opening, is formed, as shown in Fig. 17. It will be particularly noted that the side cutting edges 221 and 222 of the tool are at least as wide, although preferably wider than half the width of a side of the polygon to be formed, so that the sides of the polygon are cut and finished by the side cutting edges 221 and 222 of the tool.

Figure 18:
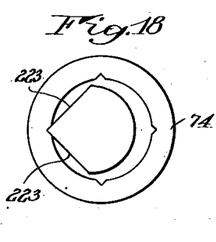
Figs. 18 and 19 are views showing steps in the operation of cutting a square opening in a piece of stock.
Figure 19:
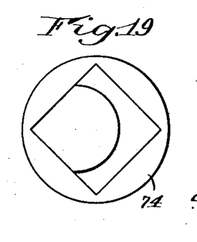

The machine of my invention may also be used to cut polygonal openings in a piece of work other than a hexagon. As shown in Figs. 18 and 19, the machine is adapted to cut a square opening in a piece of work. In the case of the square, the side cutting edges 222 and 223 of the tool are at a right angle to each other, and as in the case of a hexagon, are of a width at least as great as that of half of one of the sides of the polygon to be cut. In cutting a square, the gear 94 is changed. Instead of using a gear having a six to five ratio with the Geneva motion gear 89, a gear is substituted for the gear 94 having a four to five ratio with the gear 89. Also the gear 132 is changed so that the ratio of the teeth of the pinion 131 to the teeth of the substituted gear is one to four. With these changes the tool will make four reciprocations, the work being indexed at each reciprocation to cut the four corners of the square. The tool will then be fed to start a second cycle of cutting and indexing operations. It will be understood that other polygonal openings may be cut in the work by changing the gear ratios.

It will be appreciated that various changes and modifications may be made in the form and relation of parts in the embodiment of my invention. For example, I have shown the work as being indexed. Obviously it is possible to maintain the work stationary and index the tool. Further I have shown the tool as being reciprocated, and I prefer this method since it eliminates any error in cutting, due to the tool being off center. However, it is possible to retain the tool stationary and reciprocate the work. Moreover, I have shown the feeding as being accomplished by moving the tool, but it would be possible to perform the feeding operations by moving the work. I do not desire, therefore, to limit my invention to the form of machine shown herein, but desire to include within the scope of my invention various modifications and alternatives which will readily suggest themselves to those skilled in the art.

I claim:

1. In a machine of the character described, a tool, means for reciprocating the tool and the work relative to each other to perform cutting operations, means for indexing the tool and the work relative to each other, and means for intermittently feeding the tool and the work relative to each other at the termination of a series of cutting operations performed on different parts of the work, said feeding means comprising a toothed member, a pawl engaging said toothed member, an eccentric member driven by the machine, and a lost motion connection between said eccentric member and said pawl for intermittently actuating said pawl.

2. In a machine of the character described, a shaft adapted to be continuously rotated, means driven from said shaft for continuously reciprocating a tool and the work relative to each other to perform a cutting operation on the work, means driven from said shaft in timed relation with the cutting operation for indexing the tool and the work relative to each other without feeding at each relative reciprocation of the tool and the work to thereby perform additional cutting operations of the same character and degree on the work until a cycle of cutting operations has been completed, means in the driving mechanism for rigidly locking a part of the driving mechanism so as to lock the work rigidly in position during each cutting operation, and means driven by said shaft in timed relation with the cutting and indexing operations for feeding the tool and the work relative to each other at the termination of a cycle of cutting operations, said feeding means including a lost motion connection between said shaft and the tool to feed the tool at the termination of a cycle of cutting operations when the tool is out of cutting relation with the work.

3. In a machine for cutting an equilateral polygonal opening having straight sides in a piece of stock having a bore, in combination, a tool, means for continuously reciprocating the tool with respect to the work to cut partially at least one corner and two adjacent sides of the polygonal opening, means for indexing the work without feeding to cut additional corners and sides of the opening until all the corners and the sides of the polygonal opening have been partially cut and a cycle of cutting operations has been completed, means for feeding the tool to enable additional cutting cycles to be performed, means for rigidly locking the tool and the work during each cutting operation; and means for performing additional cutting cycles and feeding operations until an equilateral polygonal opening having straight sides has been completed.

4. In a machine of the character described, in combination, a tool, means for moving the tool and the work relative to each other to perform cutting operations, means for indexing the tool and the work relative to each other, means for intermittently feeding the tool and the work relative to each other at the termination of a series of cutting operations performed on different parts of the work, and means independent of the means for indexing the tool and the work relative to each other for rigidly locking the work after each indexing operation.

5. In a machine of the character described, in combination, a rigid frame, a tool, means for moving the tool and the work relative to each other to perform cutting operations, means for indexing the tool and the work relative to each other, means for intermittently feeding the tool and the work relative to each other at the termination of a series of cutting operations performed on different parts of the work, said feeding means comprising a toothed member carried by a fixed part of the rigid frame, and means for intermittently actuating said toothed member in synchronism with the cutting operations.

6. In a machine for cutting a polygonal opening in a piece of bored stock, in combination, a cutting tool having two cutting edges extending at an angle to each other corresponding to the angles of the corners of the polygon to be cut and at least one of said cutting edges being at least half the length of the sides of the polygon, means for reciprocating the tool and the stock relative to each other to perform cutting operations, means including driving mechanism for indexing the tool and the stock relative to each other after each cutting operation, a spindle by which said stock is rotatably supported, means including parts of the driving mechanism for releasably locking the spindle rigidly in position after each indexing operation, and means for feeding the stock and the tool relative to each other.

7. In a machine for cutting a polygonal opening in a piece of bored stock, in combination, a cutting tool having two cutting edges extending at an angle to each other, means for reciprocating the tool and the stock relative to each other to perform cutting operations, means including driving mechanism for indexing the tool and the stock relative to each other after each cutting operation, a chuck for holding the stock, means including a lock actuated in synchronism with the cutting operations for locking the chuck prior to each cutting operation, and means for feeding the stock and the tool relative to each other.

8. In a machine for cutting a polygonal opening in a bored stock element, in combination, a tool element, means for reciprocating the tool and the stock relative to each other, means for indexing the tool and the stock relative to each other at the termination of each cutting operation, means for feeding the tool and the stock relative to each other at the termination of a predetermined number of indexing operations, and a movable carriage by which one of said elements is carried, said carriage being actuated by said feeding means.

9. In a machine for cutting a polygonal opening in a piece of stock, in combination, a cutting tool, a member in which the tool is rigidly supported against movement with respect to the member, means for reciprocating said member to perform cutting operations in the stock, a movable carriage by which said member is supported, means for feeding the carriage at the end of a predetermined number of cutting operations, and means for indexing the work.

10. In a machine for cutting a polygonal opening in a piece of stock, in combination, a cutting tool having two cutting edges extending at an angle to each other corresponding to the angles of the corners of the polygon to be cut and at least one of said cutting edges being at least half the length of the sides of the polygon, a member in which the tool is rigidly supported against movement with respect to the member, means for reciprocating said member to perform cutting operations in the stock, a movable carriage by which said member is supported, means for feeding the carriage at the end of a predetermined number of cutting operations, and means for indexing the stock.

11. In a machine for cutting a polygonal opening in a piece of stock, in combination, a cutting tool, a member in which the tool is rigidly supported against movement with respect to the member, means for reciprocating said member to perform cutting operations on the stock, a movable carriage by which said member is supported, means for feeding the carriage at the end of a predetermined number of cutting operations, means for indexing the stock at the termination of each cutting operation, and means for rigidly locking the stock at the termination of each indexing operation.

12. In a machine for cutting a polygonal opening in a piece of stock, in combination, a cutting tool having two straight edges extending at an angle to each other corresponding to the angularity of the corners of the polygon, a member in which the tool is rigidly supported against movement with respect to the member, means for reciprocating said member to perform a series of identical cutting operations in the stock, a movable carriage by which said member is supported, means for feeding the carriage at the end of a predetermined number of cutting operations, and means for indexing the stock at the termination of each cutting operation.

13. In a machine for making a polygonal opening in bored stock, in combination, a tool, a spindle by which said stock is rotatably supported, means for continuously reciprocating the tool and the stock relative to each other to perform cutting operations on the stock until the polygonal opening is completed, driving mechanism including a Geneva motion for indexing the spindle at the termination of each cutting operation until a series of similar cuts have been made in the stock, means for releasably locking the spindle in timed relation with the cutting operations, and means for feeding the tool and the stock relative to each other at the end of a predetermined number of indexing operations.

14. In a machine for making a polygonal opening in bored stock, in combination, a tool, means for continuously reciprocating the tool and the stock relative to each other to perform cutting operations on the stock until the polygonal opening is completed, driving mechanism including an indexing gear for indexing the stock at the termination of each cutting operation until a series of similar cuts have been made in the stock, a chuck for holding the stock to which said indexing gear is directly and rigidly connected, means actuated by a portion of said driving mechanism in timed relation with the cutting operations for rigidly locking said indexing gear against movement during each cutting operation, and means for feeding the tool and the stock relative to each other at the termination of each series of similar cuts until the desired number of series of cuts have been made.

15. In a machine for making a polygonal opening in bored stock, in combination, a tool having two angularly disposed cutting edges at least one of which is at least half as long as the sides of the polygonal opening to be cut, means for continuously reciprocating the tool and the stock relative to each other to perform cutting operations on the stock until the polygonal opening is completed, driving mechanism including an indexing gear for indexing the stock at the termination of each cutting operation until a series of similar cuts have been made in the stock, a chuck for holding the stock to which said indexing gear is directly and rigidly connected, means actuated by a portion of said driving mechanism in timed relation with the cutting operations for rigidly locking said indexing gear against movement during each cutting operation, and means for feeding the tool and the stock relative to each other at the termination of each series of similar cuts until the desired number of series of cuts have been made.

16. In a machine for cutting a polygonal opening in a bored stock element, in combination, a tool element, means for reciprocating the tool and the stock elements relative to each other, means for indexing the tool and the stock elements relative to each other at the termination of each cutting operation, means for feeding the tool and the stock elements relative to each other at the termination of a predetermined number of indexing operations, a movable carriage by which one of said elements is carried, said carriage being actuated by said feeding means, a rotatable spindle by which the other of said elements is carried, and means actuated prior to each cutting operation for rigidly locking said spindle during the cutting operation and for releasing the spindle at the termination of each cutting operation.

17. In a machine for cutting a polygonal opening in a bored stock element, a tool element having two angularly disposed cutting edges at least one of which is at least half as long as one of the sides of the polygon to be formed, means for reciprocating the tool and the stock elements relative to each other, means for indexing the tool and the stock elements relative to each other at the termination of each cutting operation, means for feeding the tool and the stock elements relative to each other at the termination of a predetermined number of indexing operations, and a movable carriage by which one of said elements is carried, said carriage being actuated by said feeding means.

18. In a machine for cutting a polygonal opening in a piece of stock, in combination, a spindle by which the stock is rotatably supported, a cutting tool, a slide in which the tool is rigidly clamped, means for reciprocating the slide to perform cutting operations in the stock, means including driving mechanism for indexing the spindle at the termination of each cutting operation, means including a releasable lock actuated by the driving mechanism for locking the spindle against rotation during each cutting operation, a carriage for supporting the slide, and means for feeding the carriage at the end of a predetermined number of indexing operations.

19. In a machine for cutting a polygonal opening in a piece of stock, in combination, a spindle by which the stock is rotatably supported, a cutting tool having two angularly disposed cutting edges at least one of which is at least half as long as one of the sides of the polygon to be formed, a slide in which the tool is rigidly clamped, means for reciprocating the slide to perform cutting operations in the stock, means including driving mechanism for indexing the spindle at the termination of each cutting operation, means including a releasable lock actuated by the driving mechanism for locking the spindle against rotation during each cutting operation, a carriage for supporting the slide, and means for feeding the carriage at the end of a predetermined number of indexing operations.

20. In a machine for cutting a polygonal opening in a piece of bored stock, in combination, a cutting tool having two cutting edges extending at an angle to each other corresponding to the angles of the corners of the polygon to be cut and at least one of said cutting edges being at least half the length of the sides of the polygon, means for reciprocating the tool and the stock relative to each other to perform cutting operations, means including driving mechanism and a Geneva motion for indexing the tool and the stock relative to each other through an angle of 60° or more after each cutting operation, a spindle by which said stock is rotatably supported, means between the spindle and the driving mechanism for releasably locking the spindle rigidly in position after each indexing operation and in synchronism therewith, and means for feeding the stock and the tool relative to each other.

21. In a machine for cutting a polygonal opening in a piece of bored stock, in combination, a support in which the stock is rigidly clamped, a cutting tool having a support in which it is rigidly clamped, said tool having two cutting edges extending at an angle to each other corresponding to the angles of the corners of the polygon to be cut and at least one of the cutting edges being at least half the length of the sides of the polygon to be cut, means for reciprocating one of said supports to reciprocate the tool and the stock relative to each other to perform cutting operations, means for indexing one of said supports so as to index the tool and the stock relative to each other, and means for intermittently feeding one of said supports to feed the tool and the stock relative to each other at the termination of a series of cutting operations performed on different parts of the work.

22. In a machine for cutting a polygonal opening in a piece of bored stock, in combination, a support in which the stock is rigidly clamped, a cutting tool having a support in which it is rigidly clamped, said tool having two cutting edges extending at an angle to each other corresponding to the angles of the corners of the polygon to be cut and at least one of the cutting edges being at least half the length of the sides of the polygon to be cut, means for reciprocating one of said supports to reciprocate the tool and the stock relative to each other to perform cutting operations, means for indexing one of said supports so as to index the tool and the stock relative to each other, means for intermittently feeding one of said supports to feed the tool and the stock relative to each other at the termination of a series of cutting operations performed on different parts of the work, and means for rigidly locking the indexed support against rotation in either direction after each indexing operation.

23. In a machine for cutting a polygonal opening in a piece of bored stock, in combination, a support in which the stock is rigidly clamped, a cutting tool having a support in which it is rigidly clamped, said tool having two cutting edges extending at an angle to each other corresponding to the angles of the corners of the polygon to be cut and at least one of the cutting edges being at least half the length of the sides of the polygon to be cut, means for reciprocating one of said supports to reciprocate the tool and the stock relative to each other to perform cutting operations, means for indexing one of said supports so as to index the tool and the stock relative to each other, means for intermittently feeding one of said supports to feed the tool and the stock relative to each other at the termination of a series of cutting operations performed on different parts of the work, and means driven in timed relation with the indexing means for rigidly locking the indexed support against rotation in either direction after each indexing operation.

24. In a machine for cutting a polygonal opening in a piece of bored stock, in combination, a support in which the stock is rigidly clamped, a cutting tool having a support in which it is rigidly clamped, said tool having two cutting edges extending at an angle to each other corresponding to the angles of the corners of the polygon to be cut and at least one of the cutting edges being at least half the length of the sides of the polygon to be cut, means for reciprocating one of said supports to reciprocate the tool and the stock relative to each other to perform cutting operations, means for indexing one of said supports so as to index the tool and the stock relative to each other, means including a movable carriage for intermittently feeding one of said supports to feed the tool and the stock relative to each other at the termination of a series of cutting operations performed on different parts of the work, and means independent of the indexing means and driven in timed relation with the indexing means for rigidly locking the indexed support against rotation in either direction after each indexing operation.

FREDERICK G. SILVA.